United States Patent [19]
Quinn

[11] 3,834,834
[45] Sept. 10, 1974

[54] COMPACT HIGH THRUST AUGMENTATION EJECTOR SYSTEM

[75] Inventor: Brian P. Quinn, Dayton, Ohio

[73] Assignee: The United States of America as represented by the Secretary of the Air Force, Washington, D.C.

[22] Filed: Mar. 7, 1973

[21] Appl. No.: 338,726

[52] U.S. Cl. .................................. 417/179, 417/198
[51] Int. Cl. ............................. F04f 5/46, F04f 5/44
[58] Field of Search ............ 417/198, 179, 180, 163, 417/167, 168, 169, 151, 197

[56] References Cited
UNITED STATES PATENTS

| | | |
|---|---|---|
| 2,990,103 | 6/1961 | Coarda et al. .................... 417/197 |
| 3,047,208 | 7/1962 | Coarda ............................. 417/197 |
| 3,212,700 | 10/1965 | Guienne et al. .................... 417/179 |
| 3,525,474 | 8/1970 | Von Ohain et al. ......... 417/163 UX |

Primary Examiner—William L. Freeh
Assistant Examiner—Richard E. Gluck
Attorney, Agent, or Firm—Harry A. Herbert, Jr.; Richard J. Killoren

[57] ABSTRACT

A thrust augmentation system having thrust augmentation channels with the reservoir length absorbed in the inlet length and with a plurality of root nozzles positioned at the inlet to mixing duct transition region together with a plurality of hypermixing nozzles extending substantially across the width of the ejector duct.

3 Claims, 11 Drawing Figures

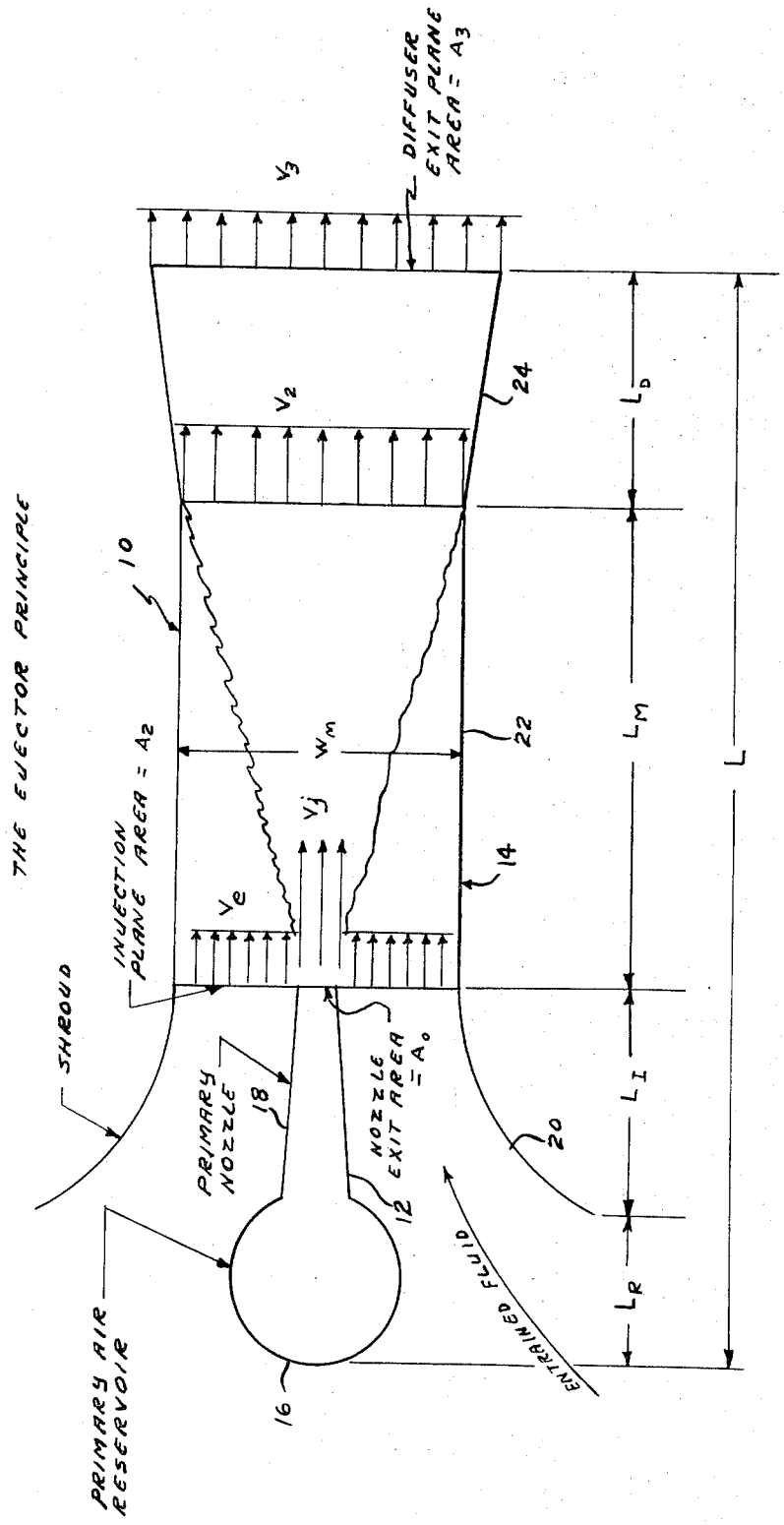

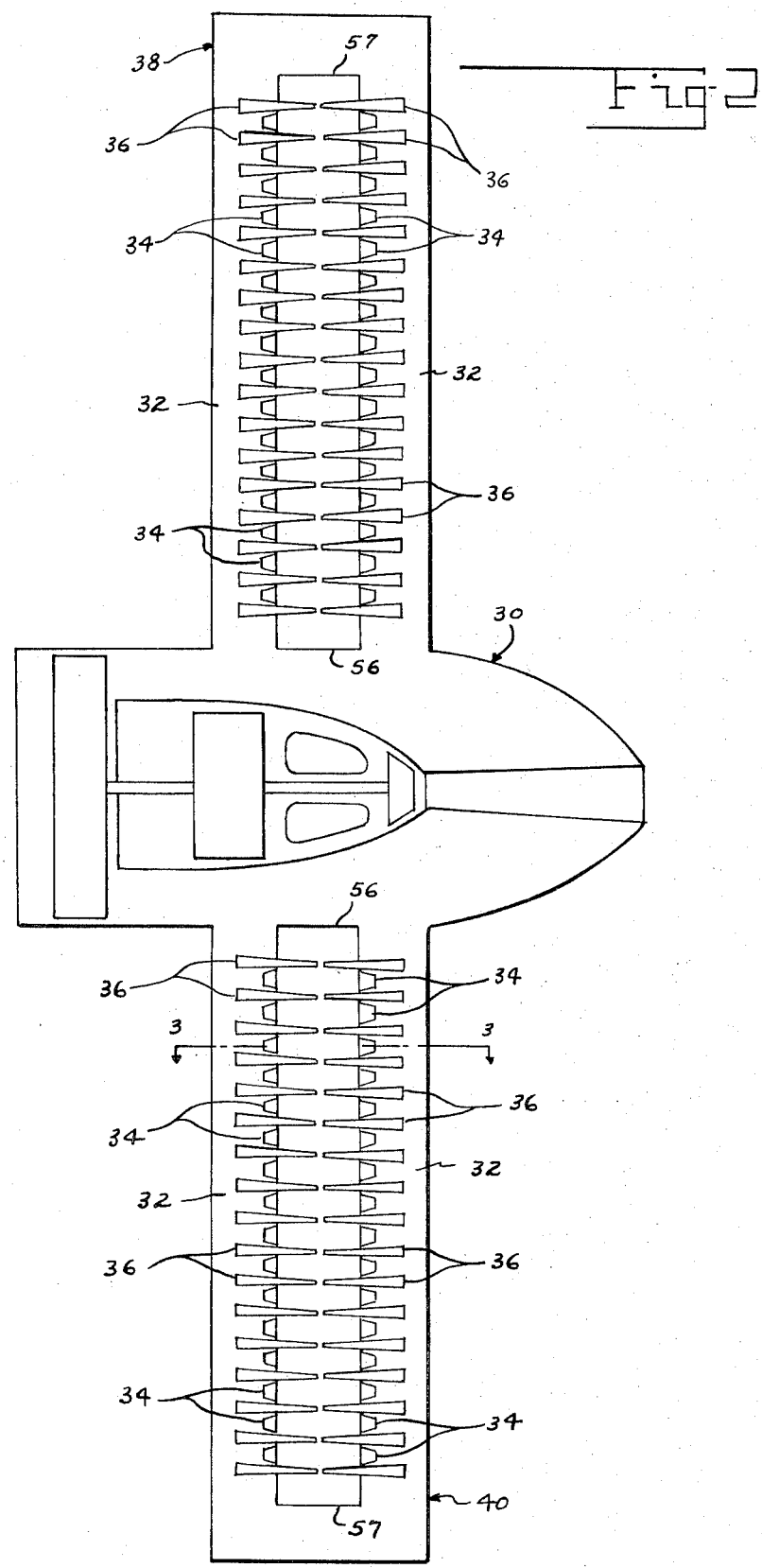

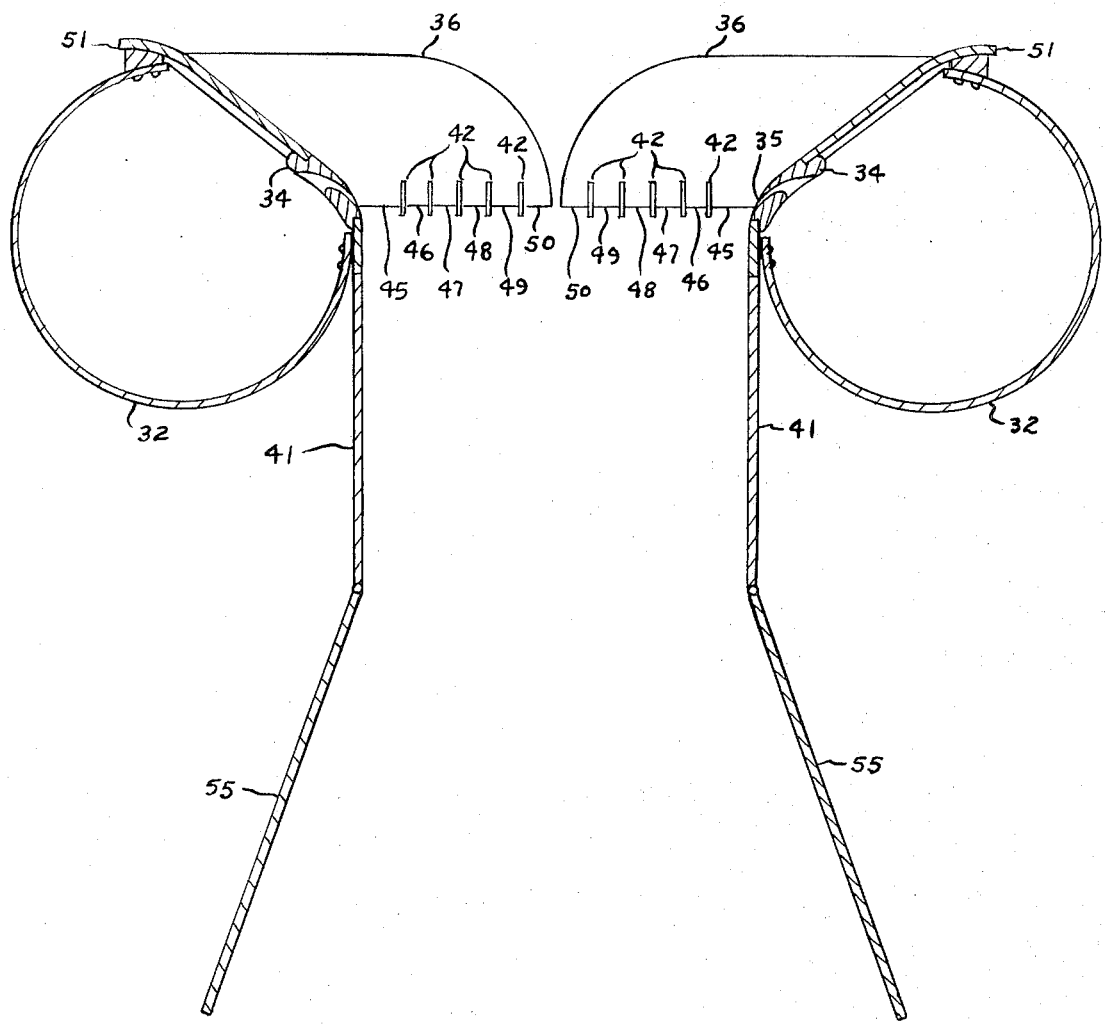

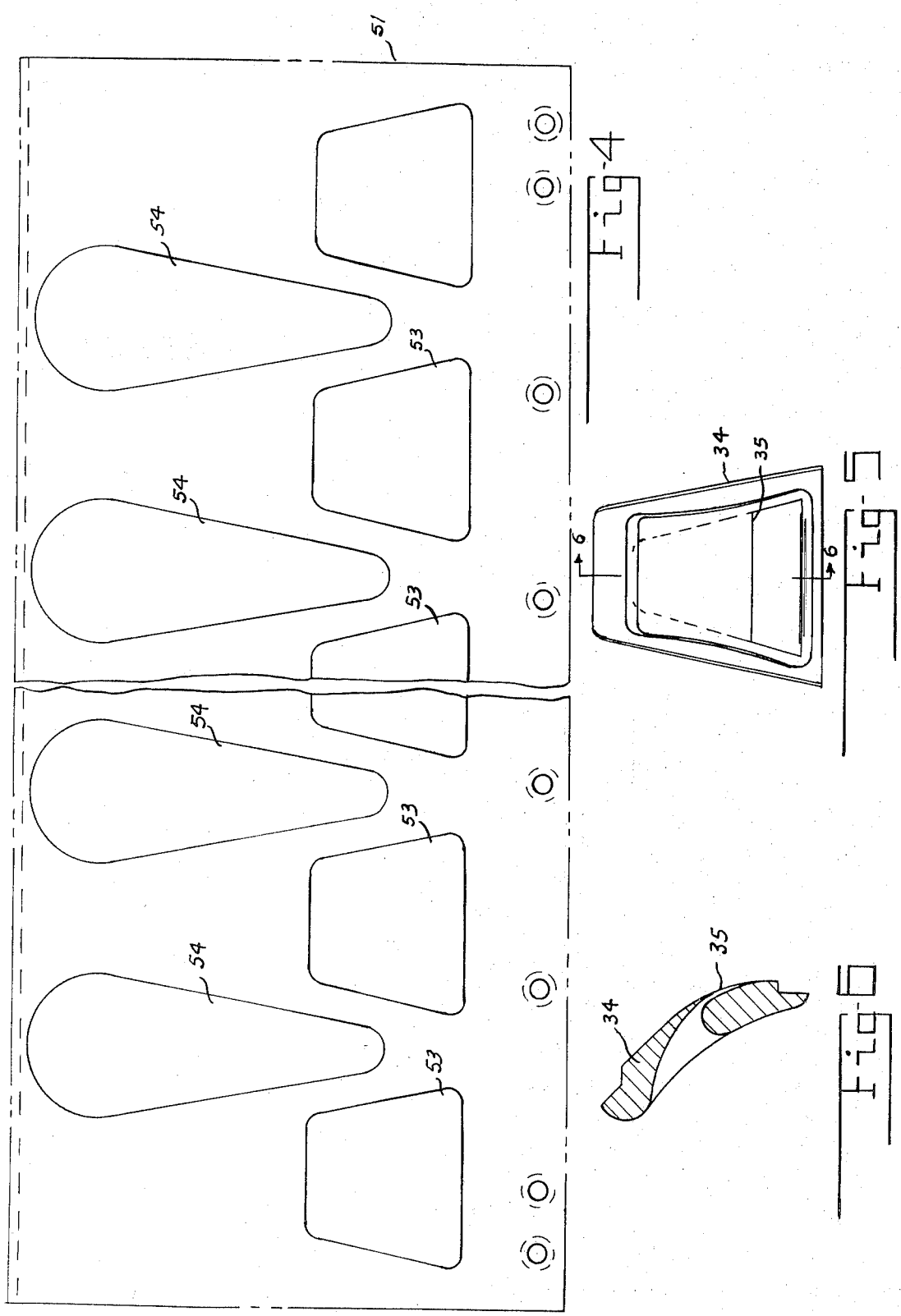

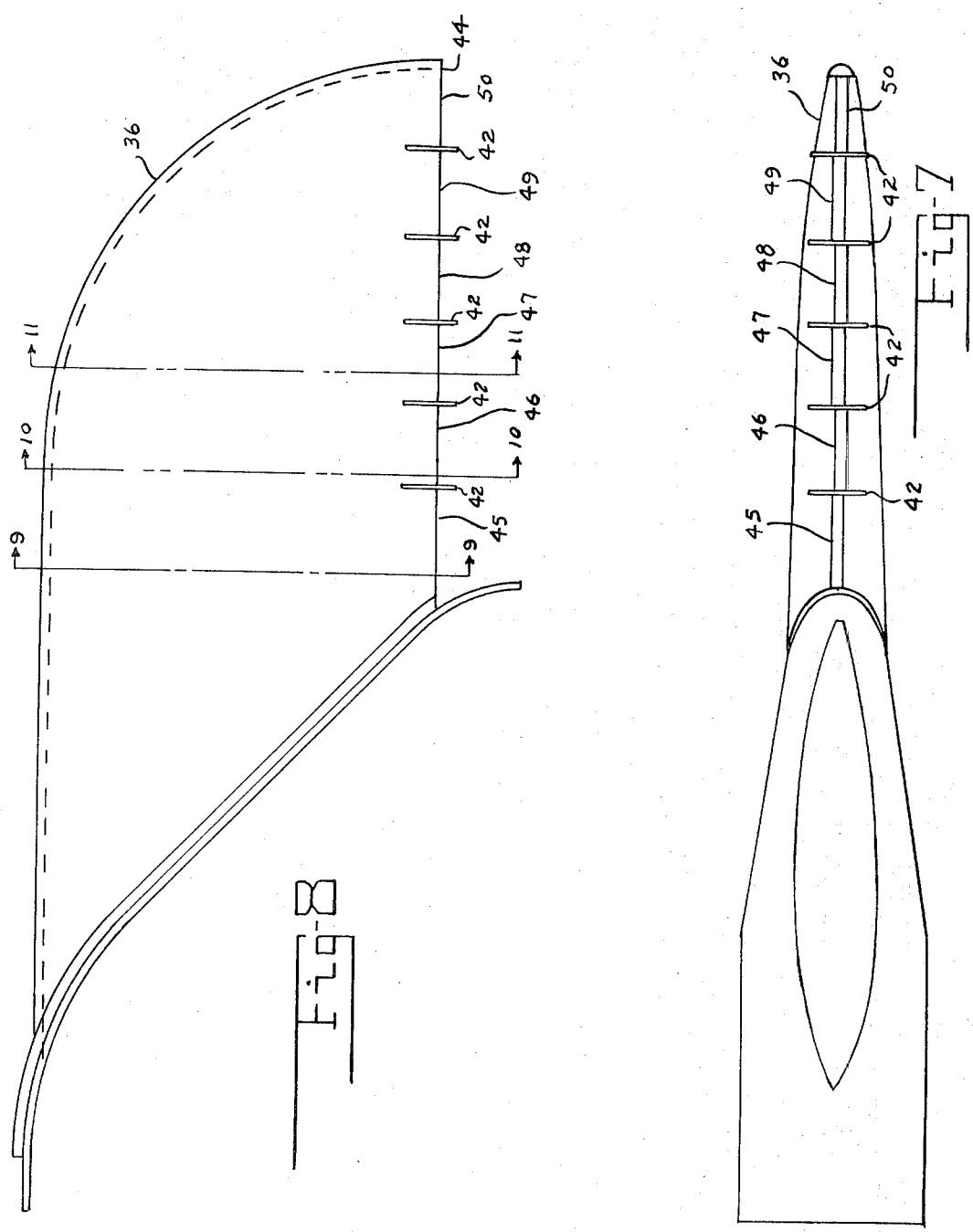

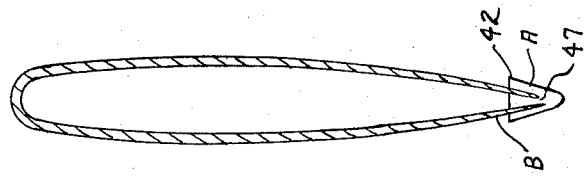
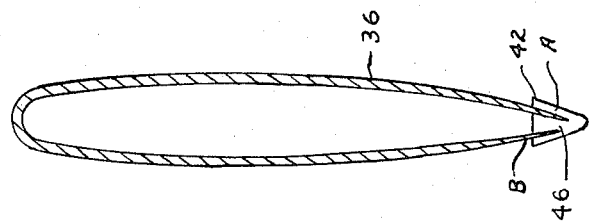
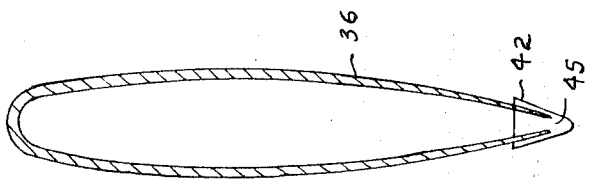

COMPACT HIGH THRUST AUGMENTATION EJECTOR SYSTEM

BACKGROUND OF THE INVENTION

Many of the V/STOL aircraft under consideration at present require considerably more propulsive thrust during the critical takeoff and landing phases of their flight, than during the cruise phase. In some systems additional power plants are installed, that are used during takeoff and landing and are stowed during the cruise phase of the flight. It is very desirable to use the same power plant for both V/STOL and cruise. One way to accomplish this is to provide ejectors which have high levels of thrust augmentation and small ejector bulk. Prior art ejectors have failed in either or both of these requirements.

BRIEF SUMMARY OF THE INVENTION

According to this invention, an ejector system is provided which makes use of hypermixing nozzles, together with root nozzles which substantially reduce the losses associated with the inlet region, the primary air nozzle, the mixing region and the diffuser. The root nozzles assist entrained air around the inlet to mixing duct transition thereby reducing inlet losses and create a blanket of high energy air that ultimately assists in substantially diffusing the flow within a very short diffusion distance. The hypermixing nozzles are used to direct the primary air down the mixing duct and to excite a system of streamwise vortices that enhance mixing which permits reducing the length of the mixing duct. Skin friction losses are reduced accordingly.

IN THE DRAWINGS

FIG. 1 is a schematic illustration showing one prior art ejector system.

FIG. 2 is a schematic diagram showing a power plant using an ejector system according to the invention.

FIG. 3 is an enlarged view in section of the device of FIG. 2 along the line 3—3.

FIG. 4 is a plan view of the nozzle panel assembly for the device of FIG. 2.

FIG. 5 is a plan view of a root nozzle for the device of FIG. 2.

FIG. 6 is a sectional view of the device of FIG. 5 along the line 6—6.

FIG. 7 is a front view of a mixer nozzle for the device of FIG. 2.

FIG. 8 is a top view of the device of FIG. 7.

FIG. 9 is a sectional view of the device of FIG. 8 along the line 9—9.

FIG. 10 is a sectional view of the device of FIG. 8 along the line 10—10.

FIG. 11 is a sectional view of the device of FIG. 8 along the line 11—11.

DETAILED DESCRIPTION OF THE INVENTION

Reference is now made to FIG. 1 of the drawing which shows a conventional thrust augmenting ejector system 10. All ejector systems have at least one primary nozzle, such as shown at 12 and a shroud such as shown generally at 14. Air from a high pressure system, not shown, is stilled in air reservoir 16 and expelled through primary nozzle 18. The shroud 14 envelopes the primary injection system and provides an inlet region 20 for the entrained air, a mixing region 22 and a diffuser 24. The primary nozzle is usually positioned so that its injection plane approximately coincides with the beginning of the mixing duct. The overall length L consists of: $L_R$, the length of the reservoir; $L_I$, the length of the inlet; $L_M$, the length of the mixing section and $L_D$, the length of the diffuser. The losses of each of the regions $L_R$, $L_I$, $L_M$ and $L_D$ usually increase as their characteristic lengths decrease. Building a compact ejector suitable for V/STOL, however, requires the total length L to be short. The device of this invention shown in FIGS. 2-11 illustrates a technique for achieving high performance from compact ejectors. One such system, modified somewhat from the showing of FIG. 1, is described in pages 20-23 of Aircraft Engineering, November 1971.

As shown in FIG. 2, air from a conventional turbofan engine 30 is supplied to ducts 32 and then to root nozzles 34 and hypermixing nozzles 36 to supply high pressure primary air to ejector systems 38 and 40.

As shown in FIG. 3, the length $L_R$, as shown in FIG. 1, is absorbed into the body of the inlet length $L_I$, as shown in FIG. 1, with the exterior walls of the reservoir also serving as the inlet region of the ejector systems. Since the transition from the inlet to the mixing duct is now abrupt, root nozzles 34, having exit slots 35 mounted flush with the surface, expel small quantities of air into the inlet and assist the entrained air, around the inlet to mixing duct transition, to thereby reduce inlet losses. They also create a blanket of high energy air along the walls 41 that assists in substantially diffusing the flow within a very short distance.

The hypermixing nozzles 36 are constructed as shown in FIGS. 7-11. Each nozzle has a plurality of flow separators 42 positioned in cross slots which divide the nozzle exit slot 44 into a plurality of sections 45-50. The sides of the slot in section 45 are of the same length as shown in FIG. 9 to provide a straight flow from the slot. Sections 46, 48 and 50 have side A longer than side B, as shown in FIG. 10, to direct the flow downward with respect to the showing in FIG. 7. Sections 47 and 49 have side A shorter than side B, as shown in FIG. 11 to direct the flow upward with respect to the showing in FIG. 7.

The nozzles 34 and 36 are mounted on stainless steel panels 51 having openings 53 for supplying air to nozzles 34 and openings 54 for supplying air to nozzles 36. Nozzles 34 and 36 are inserted from the side of the panel away from the inlet. Nozzles 34 are welded in openings 53 and nozzles 36 are welded in openings 54. The panels 51 are sealed with a self forming gasket and are bolted to the ducts 32 and form a part of the wall of the ducts. Diffuser panels 55 are hinged to wall members 41. Other means, known in the art, may be used instead of the hinged diffuser walls for changing the direction of air flow for V/STOL and forward flight. While not shown, nozzles would normally also be provided at the end walls 56 and 57.

In the device built, the shape of nozzles 36 was related to the configuration of panels 51 so that the inlet area gradually decreases toward the mixing region. This is desirable to provide a low loss inlet for the ejector systems. This system achieved thrust augmentation ratios of 2.00 whereas prior art devices have produced thrust augmentation ratios of about 1.60.

While the device has been described for use on V/STOL aircraft, it could also be used as a propulsion system for trains or sea going craft.

There is thus provided an ejector system which provides high level of thrust augmentation with small ejector bulk.

I claim:

1. In a thrust augmentation ejector system, comprising: a rectangular shaped duct having an inlet region, a mixing region and a diffuser region; a pair of primary gas supply ducts forming side walls for said inlet region; a plurality of first spaced apart hypermixing nozzles extending from one of said side walls approximately one half way across said inlet region; a plurality of second spaced apart hypermixing nozzles extending from the other side wall approximately to said first hypermixing nozzles in said inlet region with the nozzles extending from the one side wall being in substantial alignment with the nozzles extending from the other side wall; said hypermixing nozzles having exit slots positioned approximately at the inlet region to mixing region transition; a plurality of root nozzles, in the walls of said supply ducts and positioned between the hypermixing nozzles; said root nozzles including means positioned at the inlet region to mixing region transition, for directing a flow of primary air along the wall of said mixing region and means for supplying air under pressure to said gas supply ducts.

2. The device as recited in claim 1 wherein said hypermixing nozzles have exit slots which are divided into a plurality of regions by flow separators, with each nozzle having a region adjacent the supply duct wall with means for directing a straight flow through the mixing region and having other alternate regions including means for directing the flow alternately in opposite directions at an angle with respect to a straight line flow through the mixing region.

3. The device as recited in claim 2 wherein the shape of the supply duct wall and the shape of the hypermixing nozzle provides a gradually decreasing inlet area toward the mixing region.

* * * * *